United States Patent [19]

Vandenburg

[11] Patent Number: 5,094,863
[45] Date of Patent: Mar. 10, 1992

[54] FOOD PACKAGE WITH RIP-CORD OPENER

[75] Inventor: Dawn M. Vandenburg, Appleton, Wis.

[73] Assignee: James River Corporation of Virginia, Richmond, Va.

[21] Appl. No.: 690,386

[22] Filed: Apr. 24, 1991

Related U.S. Application Data

[63] Continuation of Ser. No. 469,338, Jan. 24, 1990, abandoned.

[51] Int. Cl.$^5$ .................... B43M 7/00; B65D 30/08
[52] U.S. Cl. .................... 426/115; 426/123; 426/127; 383/206; 383/88; 206/522; 229/DIG. 13
[58] Field of Search .......... 206/610, 616, 617, 618, 206/619, 623, 627, 484, 484.1, 484.2; 426/126, 127, 115, 122, 123; 383/113, 114

[56] References Cited

U.S. PATENT DOCUMENTS

| | | |
|---|---|---|
| 2,360,597 | 10/1944 | Topolski . |
| 3,038,651 | 6/1962 | Cloudsley .................... 206/627 |
| 3,246,833 | 4/1966 | Schlienz et al. .................... 206/618 |
| 3,494,538 | 2/1970 | Matthews .................... 206/616 |
| 3,973,045 | 8/1976 | Brandberg et al. .................... 206/618 |
| 4,390,554 | 6/1983 | Levinson .................... 426/107 |
| 4,589,553 | 5/1986 | Ferrero . |
| 4,629,071 | 12/1986 | Tani .................... 206/616 |
| 4,638,911 | 1/1987 | Prohaska . |
| 4,650,079 | 3/1987 | Tani .................... 206/484 |
| 4,777,054 | 10/1988 | Greenhouse .................... 206/610 |
| 4,797,010 | 1/1989 | Coelho .................... 426/127 |

FOREIGN PATENT DOCUMENTS 2121757  1/1984  United Kingdom ............... 426/115

*Primary Examiner*—William I. Price
*Attorney, Agent, or Firm*—Sixbey, Friedman, Leedom & Ferguson

[57] ABSTRACT

A food packaging material suitable for a variety of food service applications, including fast food restaurants is provided. The packaging is preferably formed from a flexible laminate sheet that includes at least one moisture impervious layer and has been formed into a receptacle having a shape suitable for enclosing and sealing fast food sandwiches and the like. Attached to the sheet is a length of rip cord having at least one free end that can be grasped and pulled by the consumer to tear the laminate sheet, thereby opening the sealed food-containing receptacle. The rip cord can be attached so that it causes one portion of the receptacle to be partially or completely separated from a remaining receptacle portion. The separated portion of the receptacle can be folded out of the way or discarded, and the remaining receptacle portion used to enclose the food product to form a convenient pouch for protecting the consumer's hands while holding the food product.

16 Claims, 3 Drawing Sheets

FOOD PACKAGE WITH RIP-CORD OPENER

This application is a continuation of Ser. No. 07/469,338, filed Jan. 24, 1990, now abandoned.

TECHNICAL FIELD

The present invention relates generally to packaging for food and specifically to an easily opened food package for fast food and like food service applications.

BACKGROUND ART

The rapidly expanding fast food industry has presented packaging designers with ever increasing challenges to design effective packaging materials and containers for the myriad food products now available from these outlets. That the fast food consumer in a hurry is more likely to choose the "drive through" window and eat in the car rather than take the time to eat inside the restaurant has created additional demands for innovative packaging for such fast food products. Effective packaging for food products intended to be served and eaten under the conditions typically encountered by a hurried consumer who is trying to drive and eat simultaneously should ideally keep the food at an appropriate serving temperature, completely seal the food and remain sealed until the consumer is ready to eat the food, allow easy removal of the food from the packaging for consumption and provide some protection to the consumer from drips, spills and the like. The packaging currently used for fast food products falls significantly short of these objectives.

At the present, the sandwiches served in fast food restaurants are typically sold in one of two primary types of packaging. One of these widely used packaging materials is a sheet of a waxed or coated paper or a paper and foil laminate that is wrapped and folded around the sandwich to cover it. If wrapped and folded tightly enough, this kind of sandwich packaging will be somewhat effective in keeping the sandwich at an appropriate serving temperature. Even when it is very tightly wrapped, this type of packaging tends to come open more easily than it should and, therefore, does not have the insulation value it should. To obtain access to the sandwich if the sheet is tightly wrapped, the consumer must unwrap and unfold the sheet, which usually requires two hands. If the consumer wishes to use the wrapping to protect his or her hands or clothing from drips or spills, the wrapping must be refolded around the sandwich so that it covers only the portion of the sandwich held in the hands. Such maneuvers cannot be performed easily in a stopped or in a moving vehicle.

The other type of food packaging most commonly used for fast food sandwiches is a rigid paperboard or foam "clam shell" type container that has a lid hinged and temporarily secured to a food-receiving bottom portion. This type of food packaging usually may be opened easily with one hand to provide access to the sandwich inside and does not always remain completely closed. However, this packaging cannot be used to enclose only that part of the sandwich held by the consumer's hand to provide protection from drips, food residues and the like while the sandwich is being eaten. A paperboard clam shell container, moreover, provides little or no insulation for the food.

Many other types of food packaging materials and containers are known in the prior art. U.S. Pat. No. 4,638,911 to Prohaska and U.S. Pat. No. 4,589,553 to Ferrero, for example, disclose flexible food packages which completely enclose the food products packaged therein and can be torn to open them so that port of the package can be left around the food. Neither of these packages, however, are particularly suitable for use in packaging food products at a fast food restaurant. Neither provides the kind of insulation or moisture barrier desired for the fast food trade. In addition, both require more complicated wrapping and sealing procedures than could be easily performed in a fast food restaurant environment. The packaging of U.S. Pat. No. 4,638,911, moreover, is stated to be useful primarily for foods having a long storage life, while the packaging of U.S. Pat. No. 4,589,553 has a configuration that limits it to foods that have a substantially rectangular shape, such as the piece of cake shown and described in connection with the packaging.

U.S. Pat. No. 2,360,597 to Topolski discloses an easily opened flexible package for food products that includes a perforated tear strip that is pulled to open the package and provide access to the food packaged therein. This particular package, which is disclosed to be made of cellophane or the like and to be useful primarily for packaging delicatessen products, is not especially suitable for fast food packaging applications. It does not provide adequate insulation for the food inside, and the food cannot be packaged and sealed easily by fast food restaurant personnel.

The prior art, therefore, fails to disclose flexible packaging for food products that may be easily applied to sandwiches and the like in a typical fast food restaurant environment which remains sealed to keep the food at proper serving temperature until opened by the consumer, and which may be opened easily by the consumer to provide access to at least a portion of the food while providing a covering for another portion of the food to protect the consumer from drips, spills and the like.

SUMMARY OF THE INVENTION

It is a primary object of the present invention to overcome the disadvantages of the prior art as discussed above and to provide flexible packages for food products that are easily applied around the food product and sealed by the employees in a typical fast food restaurant environment, that remain sealed and are then easily removed by the consumer to provide access to the food.

It is another object of the present invention to provide a flexible package for food products including a tear strip element which may be pulled to open the package, thereby providing ready access to the food in the package.

It is yet another object of the present invention to provide a flexible food package that completely seals the food when it is closed and can be opened to form a pouch that partially encloses the food and protects the consumer's fingers while the food is being eaten.

It is a further object of the present invention to provide packaging for food products that will not open when the food is handled until the consumer is ready to open it.

It is a still further object of the present invention to provide packaging for fast food product that insulates and completely seals the food until ready for consumption, thereby keeping hot foods at appropriate serving temperatures and protecting the food packaged therein from contamination.

The aforesaid objects are achieved by providing a flexible packaging material suitable for contacting food products including a pliable sheet, preferably formed of a laminate that includes at least one moisture impervious layer. The sheet is formed into a receptacle sized to completely enclose a desired food product, such as, for example, a fast food hamburger, when sealed. Sealing may be achieved by suitable adhesives and the like. A tear strip is secured to the sheet and allows the packaging to be easily opened by the consumer simply by pulling the free end of tear strip, which tears open the sealed receptacle. After it is opened, the remaining portion of the receptacle may form a pouch which encases a portion of the food product so that the consumer can hold the food by the pouch while eating it, thereby protecting his fingers.

Other objects and advantages of the present invention will be apparent from the following description, claims and drawings.

BEST MODE FOR CARRYING OUT THE INVENTION

The food packaging material of the present invention is especially well-suited for packaging many of the kinds of foods served at fast food restaurants. Foods that have been cooked and are intended to be served hot can be packaged effectively according to the present invention. Sandwiches, in particular, will remain warm and retain their moisture for a much longer time than when packaged in the food packaging currently used by fast food restaurants. In addition, the present packaging stays sealed, but is easily opened by the consumer and also provides a convenient protective wrapper by which the consumer can hold the sandwich or other food product while keeping his hands clean. Because the packaging of the present invention stays sealed, the food packaged therein can be subjected to rougher handling than conventionally packaged fast food. As a result, food items packaged according to the present invention may be distributed and served by methods and under circumstances that would cause conventional food packaging to open and spill the food product or subject it to environmental contamination.

The food packaging of the present invention can take a variety of forms, depending upon the particular food product to be packaged. The drawings illustrate two packaging embodiments; however, these are intended to be illustrative and not limiting. The present packaging in its most basic form is made from a flexible, pliable sheet with insulating properties that includes a rip cord or tear strip attached in a manner that will tear the sheet when the cord is pulled. The sheet is cut to size and partially sealed to form a pouch or receptacle for a food product. After the food product is inserted into the receptacle, the receptacle is sealed to form a package that completely encases the food product. The rip cord is then pulled by the consumer to tear open the package and remove the food.

Figure 1:
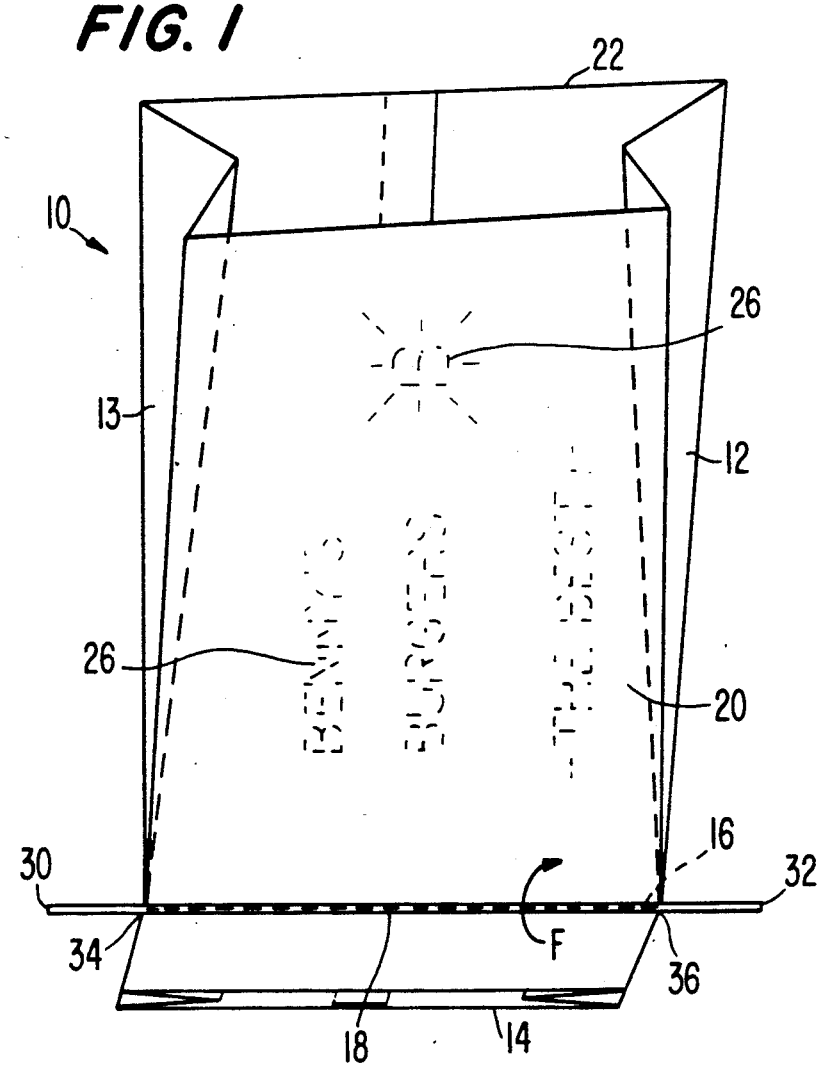
FIG. 1 is a front perspective view of one embodiment of the food packaging of the present invention.
Figure 4:
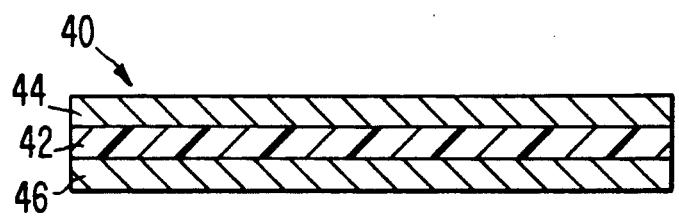
FIG. 4 is a cross-sectional view of one type of laminate sheet that may be used to form the food packaging of the present invention.

Referring to the drawings, FIG. 1 illustrates, in front perspective view, one embodiment of a food package made in accordance with the present invention. The flexible sheet material, which will be described in more detail below in connection with FIG. 4, is shown formed into a bag 10 with "pinch pleated" side walls 12 and 13. One end 14 of the bag is folded at 16 in the direction of arrow F over a suitable length of cord 18 and then sealed to permanently close and secure end 14. FIG. 1 shows end 14 partially folded prior to being sealed on the top surface 20 of the bag. The rip cord is attached to the bag 10 at the fold 16. At least a portion of the length, and preferably most of the length, of the cord must be secured to the bag 10 or it is likely to come loose from the fold 16 and drop off. The cord will also function better as a tear strip if it is securely fastened to the bag along the fold 16 prior to sealing end 14 in place.

Figure 2:
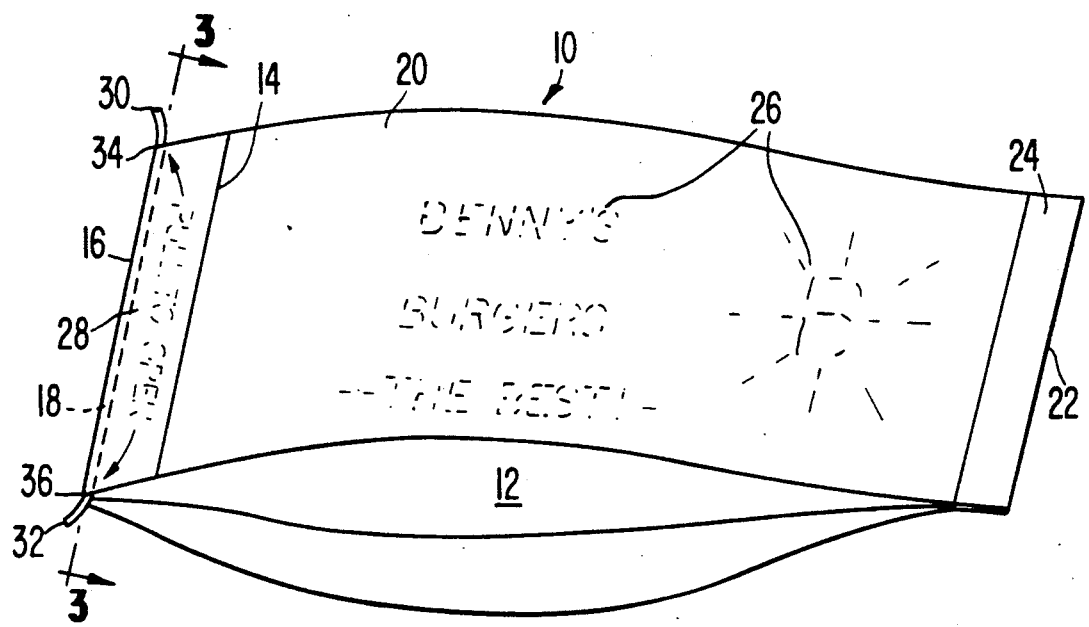
FIG. 2 is a top perspective view of the embodiment of the food packaging shown in FIG. 1 containing a food product.

FIG. 2 illustrates the bag 10 with end 14 folded and sealed to close this end. Although end 14 is shown folded in the direction of arrow F and sealed on the top surface 20 of the bag, it could be sealed in the opposite direction. In this instance, cord 18 would also be attached to the other side of the bag. FIG. 2 also illustrates the bag 10 filled with a food product rather than empty, as in FIG. 1. End 22 has been sealed to produce a sealing zone 24. The sealing of this end is performed by restaurant or food service personnel once the food product has been placed in the bag. The sealing of end 14 preferably would be done before the bag 10 is provided to the fast food or other food service outlet.

The sealing of ends 14 and 22 can be accomplished with any one of a number of types of adhesives suitable for food packaging materials. Cold seal, pressure sensitive, and hot melt adhesives that retain their adhesive character to form an effective seal in the presence of the fats and oils that are present in many food products are preferred. Other methods of sealing the end 14 of the bag 10 which securely hold the bag closed may also be used.

The present food packaging would be supplied to the fast food restaurant or other outlet as a partially sealed food receptacle such as in the form shown in FIG. 1. The bag 10 is preferable provided in sizes suitable for packaging a variety of different size food products. A bag of a suitable size is selected, and the appropriately sized food product (not shown) is placed inside by food service personnel. The open end 22 of the bag is then sealed to produce a completely closed and sealed food package, such as that shown in FIG. 2.

The sealing zone 24 preferably extends completely across the end of the bag 10 and is wide enough to tightly and securely fasten the bag top and bottom walls together. The same sealing materials and methods, i.e., cold seal, pressure sensitive and hot melt adhesives, used to seal end 14 can also be used to seal end 22. In addition, if the bag is formed of a material that includes a plastic, such as polyethylene, that can be heated and melted to cause the bottom and top walls to adhere together, the end 22 of the bag 10 can be sealed by any one of a number of available heat seal devices.

Prior to forming the flexible sheet into a receptacle such as bag 10, the sheet may be printed with designs and identifying indicia, such as those shown at 26 in FIGS. 1 and 2. This preferably includes instructions 28 in the vicinity of the tear strip or rip cord 18 to direct the consumer how to open the completely sealed food package containing the food product.

If desired, prior to sealing, air, preferably warm air if the food product is hot, may be added to the bag to inflate it slightly. The food product and air are then sealed in the bag as described above. The air cushions the food to keep it from being crushed and also provides some insulation to keep the food at a proper serving temperature until the bag is opened.

The bag 10 is opened by grasping either one of the ends 30,32 of the rip cord 18 and pulling it toward the other end. Since the cord is secured to the bag material along most of its length, the bag will tear open as the cord is pulled. The cord, therefore, must be formed of a material which is strong enough to tear the bag material open without breaking the cord. There are many available materials that will achieve this purpose and are suitable for forming the rip cord or tear strip 18 of the present invention. A fine string having a weight and tensile strength suitable to that of dental floss is one preferred type of cord material. However, there are other materials that will also function well for this purpose.

Figure 3:
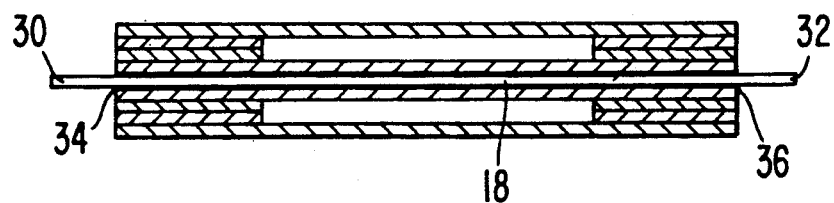
FIG. 3 is a cross-sectional view taken along line 3—3 of FIG. 2.

FIG. 3 illustrates, in cross-section taken along line 3—3 of FIG. 2, the placement of the cord 18 in the fold 16 of bag 10. It can be clearly seen in FIG. 3 that the cord 18 will be required to tear through several layers of bag material, particularly at the outer corners 34 and 36 where the material is folded to form the pinch pleated side walls 12 and 13. This is accomplished more easily when the cord 18 is firmly secured at the fold 16.

Many types of flexible, pliable sheet materials may be used to form the packaging material of the present invention. Although a laminate is particularly preferred because it presents the capability for incorporating both a moisture-impervious layer and an insulating layer in the packaging, some types of single layer coated sheets could also be used to form the present packaging material. FIG. 4 illustrates one type of laminate found to be especially effective in forming an easily sealed insulating package according to the present invention. The laminate 40 shown in FIG. 4 is a three layer laminate that includes a central layer 42 of polyethylene, one outer layer 44 of a tissue, and a second outer layer 46 of paper. One preferred laminate of this composition is described in commonly assigned copending patent application Ser. No. 333,034, filed on Apr. 4, 1989, and is commercially available under the name "QUILT-RAP". The disclosure of Ser. No. 333,034 is incorporated herein by reference. The preferred composition of this three layer laminate includes a central layer 42 of low density polyethylene web, a layer 44 of an absorbent tissue web having a weight of about 10 to 11 pounds, and a layer 46 of a paper web having a weight of about 15 pounds. This material can be used to form a superior packaging material that will allow the food to retain heat and moisture until the packaging is opened. The tissue web is preferably placed in contact with the food product so that it can absorb food juices and the like.

Other two or three-layer laminates could also be used effectively to form the food packaging material of the present invention. For example, a two-layer laminate of foil and tissue could be used to produce the food bag 10 of FIGS. 1 and 2. Additionally, a single layer sheet, such as a dry waxed paper, might be used for certain types of food products.

Figure 5:
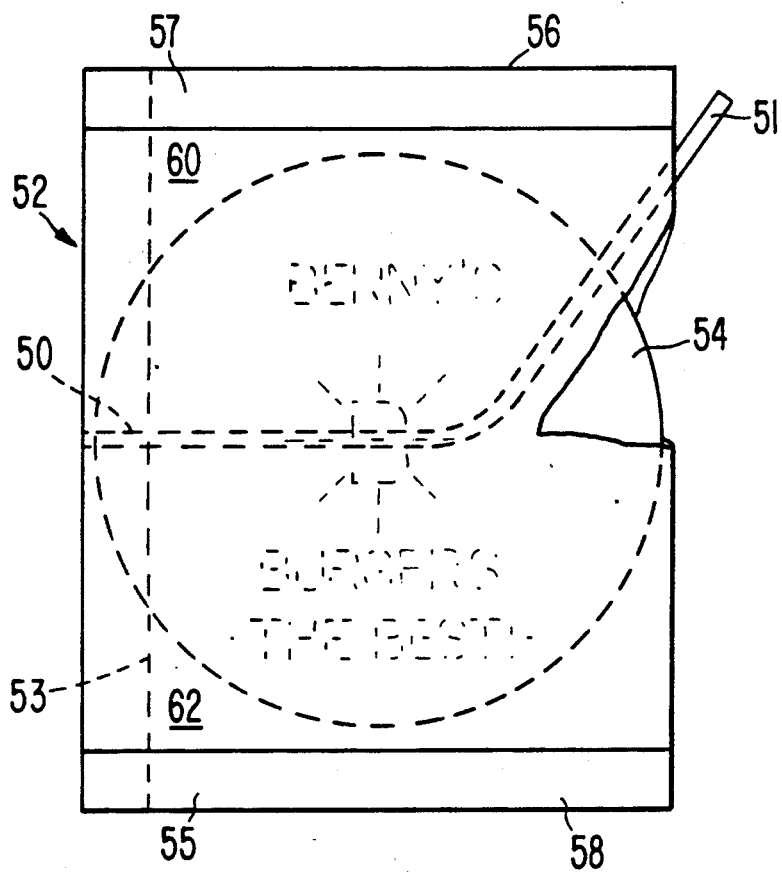
FIG. 5 is a top view of a second embodiment of the present invention showing the packaging partially opened by the tear strip.

FIG. 5 illustrates a second embodiment of the present invention. In this embodiment, the tear strip or rip cord 50 is attached to the package 52 so that it surrounds the food product 54 packaged inside. The cord 50 is shown located approximately equidistantly between the sealed package ends 56 and 58, although this location may be varied.

Figure 6:
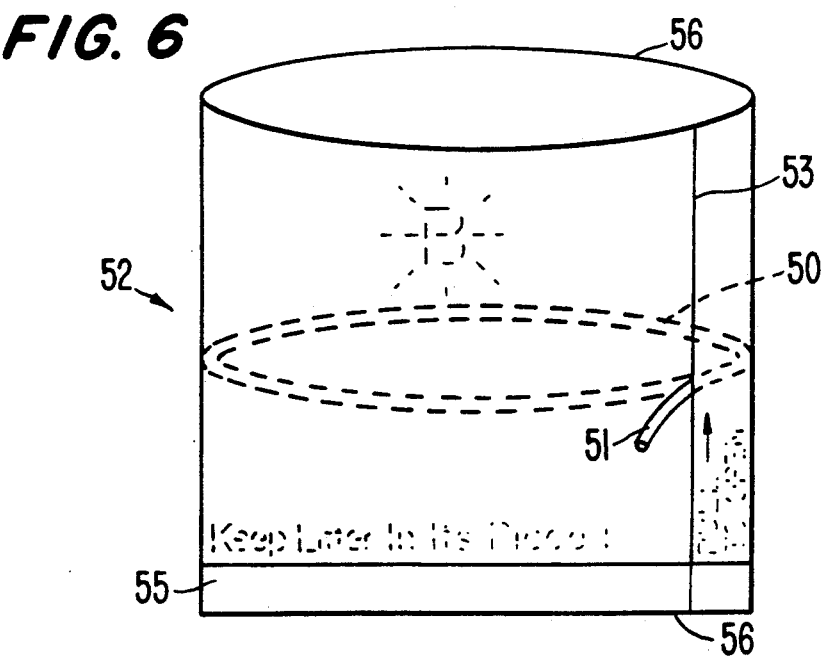
FIG. 6 is a back perspective view of the FIG. 5 embodiment of the food packaging of the present invention prior to the insertion of a food product.

Attachment of the cord 50 at the location shown in FIG. 5 must be done while the packaging material is still flat, before it is formed into a food receptacle. FIG. 6 illustrates the attachment of the cord 50 to the package 52. This type of package is made of a single sheet that is sealed along one edge to form a seam 53, which is shown in FIG. 6 at one side of the package. The sheet could be folded so that the seam 53 is located anywhere on the package, however. Prior to forming the sleeve, a suitable length of cord 50 is secured to that side of the sheet that will form the inside of the package 52. The length should be chosen so that one end 51 is loose and extends beyond the seam 53 a sufficient distance to allow a consumer to grasp the cord and pull it. The end 58 of the package should be substantially permanently sealed, as at seal zone 55, by heat sealing, cold seal, or pressure sensitive adhesives and the like before the food product 54 is placed in the package 52. The open end 56 of the package is similarly sealed, as at seal zone 57, after the warm or hot food product 54 is placed inside to effectively insulate the food.

Although the cord 50 is shown in FIGS. 5 and 6 to be attached around the entire circumference of the food package 52, it may also be attached to only a portion of the package circumference. If the cord 50 has been attached around the entire circumference of the package, preferably by firmly securing it to the inside of the packaging material, the tension on the cord produced when the consumer pulls the end 51 of the cord will tear the packaging material completely about the circumference. This action allows a portion of the packaging to be completely separated and removed from the remainder of the package.

Figure 7A:
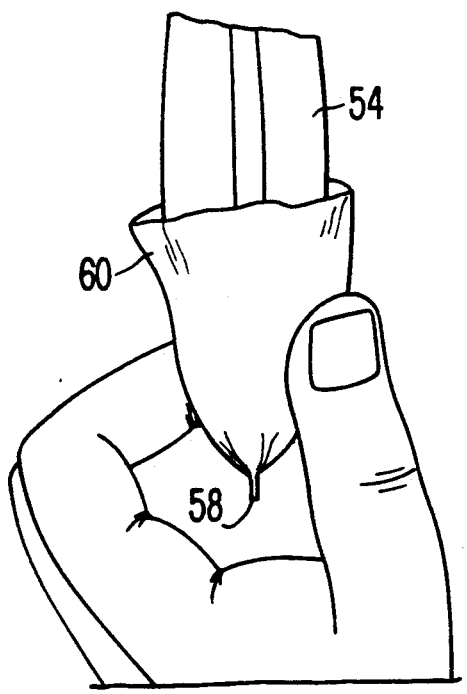
FIGS. 7a and 7b shows the food package of the present invention opened to form a pouch held by a consumer of the food product.

The removal of the top half 60 of the package 52 leaves the bottom half to form the convenient pouch 62 shown in FIG. 7a which the consumer can use to cover and hold the hamburger while it is being eaten. The pouch 62 protects the consumer's fingers from becoming soiled with food and may also protect the consumer's clothing from drips, spills and the like.

Figure 7B:
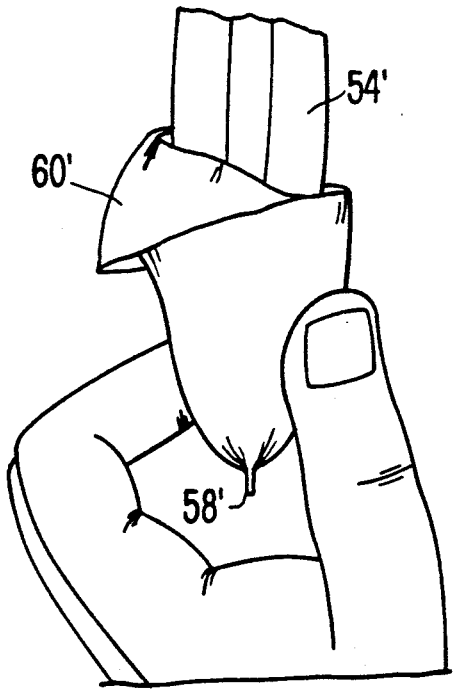

However, if the rip cord or tear strip is attached to only a portion of the circumference of the package, the tension on the cord created when the free end is pulled will produce an opening in the package (not shown) through which the food product packaged inside is visible. The torn portion of the packaging is not completely separated and removed, but may be folded back to expose the food product and provide additional protection to the consumer as shown in FIG. 7b. In this modification of the FIG. 5 and 6 embodiment, the partially separated portion 60' of the package 52' is folded away from the food product 54'. If the consumer does not consume the entire food product, the partially separated portion 60' can be unfolded and wrapped around the food product to protect it for storage. The partial attachment of portion 60' to the package 52' produced by securing the rip cord only partially around the package circumference may be more desirable to some users of the present packaging materials because of the potential reduction of litter achieved by this packaging.

Two embodiments of food packaging according to the present invention have been shown and described herein. Many other variations and modifications of the basic inventive concept are also possible, however, and are intended to be encompassed within the scope of the present invention. For example, all types of bags, such as flat bottomed bags, pouches and the like may be employed. In addition, the packaging may be made in a shape other than a rectangle. The packaging could be circular to accommodate sandwich rolls such as hamburger buns, English muffins, bagels and the like. If a circular shape is chosen, the rip cord could be located in such different positions as around the circumference of the circle or across the top and/or bottom surfaces of the package. A triangular shaped package would conveniently hold wedges of pie and the like. As with a circular package, the rip cord or tear strip could be placed in one or more different locations on the packaging.

It is contemplated that the present packaging material will be provided to a fast food restaurant or other food service outlet with the rip cord or tear strip preferably secured firmly in place and in a form that allows the food product to be easily inserted into the packaging and securely sealed by food service personnel. This will allow freshly prepared food to be sealed in packaging while it is hot or warm. The insulating properties of the present packaging, moreover, keep the food warm and prevent it from drying out, even when it is packaged some time prior to being sold or served.

INDUSTRIAL APPLICABILITY

The easy-to-open, sealed food packaging material of the present invention will find its primary use in packaging foods sold by fast food restaurants and the like. However, it is also ideally suited for other food service applications. The present food packaging could be used by vendors at sporting and other events where food is customarily sold to customers in the stands. The use of this packaging would insure that the "red-hots" were actually hot by the time the vendor reached the patrons in the end zone or outfield seats. Additionally, because the novel food packaging described herein will not come open until opened by means of the rip-cord or tear strip by the consumer, it will enable fast food restaurants to use drive-through stations remote from the restaurant building. The packaged food can be transported to the remote station by pneumatic tubes and the like since the present packaging so effectively seals the food.

I claim:

1. A package for food products wherein a fully prepared food product is placed in the package at a desirable serving temperature and the package is sealed so that it remains sealed until opened by the consumer, said package comprising:
   (a) flexible sheet means for forming a bag-shaped receptacle capable of enclosing a food product, said flexible sheet means comprising a three layer laminate including a moisture impervious central layer positioned between a moisture vapor pervious absorptive food-contacting layer and an outer non-food-contacting layer, said bag-shaped receptacle including opposed pinch pleated side walls and opposed sealable ends adjacent to said side walls;
   (b) seal means associated with said flexible sheet means for sealing the ends of the bag-shaped receptacle formed from said flexible sheet means so that said bag-shaped receptacle completely encloses the food product placed inside the receptacle;
   (c) rip cord means firmly secured within a fold formed in one end of said bag-shaped receptacle during sealing of said one end for opening the receptacle so that it no longer completely encloses the food product.

2. The package described in claim 1, wherein said central layer is formed from polyethylene, one of said outer layers is formed from an absorbent tissue web and the other of said outer layers is formed from a paper web.

3. The package described in claim 1, wherein one outer layer of said laminate is a foil web and the other outer layer of said laminate is an absorbent tissue web.

4. The package described in claim 1, wherein said rip cord means includes a finger grip means to be grasped and pulled by the consumer to open said package.

5. The package described in claim 4, wherein said rip cord means is secured to the sheet means such that when the consumer grasps the finger grip means and pulls the rip cord means, all of the laminate layers are torn, and the food product adjacent to the rip cord means is exposed.

6. The package described in claim 1, wherein said laminate further includes an inherently self adhesive material and said seal means is formed by heating the self adhesive material to cause the laminate to adhere to itself, thereby sealing the package around the food.

7. A sealable easily opened package for fast food sandwiches formed from a flexible sheet of a three-ply laminate comprising a central moisture impervious layer between a moisture pervious absorbent food-contacting layer and an outer non-food-contacting layer, wherein the sheet is folded and sealed to form a bag having pinch pleated sides and a sealed end formed by folding one end of the bag over on itself including opener means for opening said package and a sealable end that may be sealed to enclose a sandwich after placement of said sandwich in the bag; and wherein said opener means comprises a length of rip cord attached within the fold of the sealed end along a major portion of its length and unattached to the sealed end along a minor portion of its length to form finger grip means for pulling the rip cord to tear the folded sealed end of said bag, thereby opening the package.

8. The package disclosed in claim 7, wherein said laminate includes a central layer of polyethylene, a food-contacting inner layer of a moisture vapor permeable, absorbent tissue and a non-food-contacting outer layer of paper.

9. The package disclosed in claim 8, wherein said central layer is formed from low density polyethylene, said inner layer is formed from tissue paper having a weight of about 10 to 11 pounds, and said outer layer has a weight of about 15 pounds.

10. A food package for holding and sealing a prepared food product intended to be served warm, said food package comprising a flexible sealable receptacle means formed from a pliable three-layer laminate comprising a central moisture impervious layer of low density polyethylene, a food contacting layer of absorbent tissue having a weight of about 10 to 11 pounds, and a non-food-contacting layer formed from paper having a weight of about 15 pounds for completely enclosing the food product, sealing means for sealing and maintaining said receptacle means in a sealed condition after the food product has been placed in the receptacle means, and opener means attached to said receptacle means actuatable by the consumer of the food product to separate at least a first portion of said receptacle means to expose a first part of said food product while leaving at least a second portion of said receptacle means enclosing a second part of said food product, thereby forming protector means for protecting the consumer's hands and clothing from said food product.

11. The food package described in claim 10, wherein said opener means is secured to said receptacle means to extend completely around said food product so that actuation of said opener means completely separates said first portion of said receptacle means from said second portion, so that said second portion forms said protector means.

12. The food package described in claim 10, wherein said opener means is secured to said receptacle means to extend partially around said food product so that actuation of said opener means does not completely separate said first portion of said receptacle means from said second portion.

13. The food package described in claim 10, wherein said sealing means comprises a zone of adhesive selected from the group consisting of pressure sensitive, cold seal and hot melt adhesives.

14. The food package described in claim 10, wherein said opener means comprises a length of cord attached to said pliable sheet along a major portion of its length to leave at least a minor portion of the length of said cord free and unattached to said laminate sheet.

15. The package described in claim 1, wherein said seal means comprises an area of adhesive selected from the group consisting of pressure sensitive hot melt and cold seal adhesive on said sheet means positioned to close and seal said receptacle around the food product.

16. The package described in claim 1, wherein said central layer is formed from low density polyethylene, said non-food-contacting layer is formed from paper having a weight of about 15 pounds, and said food-contacting absorbent layer is formed from absorbent tissue having a weight of about 10 to 11 pounds.

* * * * *